(12) United States Patent
Nielsen

(10) Patent No.: US 9,920,748 B2
(45) Date of Patent: Mar. 20, 2018

(54) METHOD AND TOOL FOR ASSEMBLING TOWER ELEMENTS

(71) Applicant: Vestas Wind Systems A/S, Aarhus N. (DK)

(72) Inventor: Ben Møller Nielsen, Lystrup (DK)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 15/305,117

(22) PCT Filed: Apr. 16, 2015

(86) PCT No.: PCT/DK2015/050095
§ 371 (c)(1),
(2) Date: Oct. 19, 2016

(87) PCT Pub. No.: WO2015/161854
PCT Pub. Date: Oct. 29, 2015

(65) Prior Publication Data
US 2017/0037830 A1   Feb. 9, 2017

(30) Foreign Application Priority Data
Apr. 22, 2014   (DK) .................................. 2014 70230

(51) Int. Cl.
  *E02D 35/00*   (2006.01)
  *E04B 1/00*   (2006.01)
  (Continued)

(52) U.S. Cl.
  CPC .............. *F03D 13/10* (2016.05); *B25B 27/16* (2013.01); *E04H 12/085* (2013.01); *F03D 13/20* (2016.05);
  (Continued)

(58) Field of Classification Search
  CPC ..... E04H 12/34; E04H 12/085; E04H 12/342; F03D 13/10; F03D 13/20; E04F 21/185;
  (Continued)

(56) References Cited

U.S. PATENT DOCUMENTS 2,393,795 A * 1/1946 Miller .................... B25B 27/16
                                                            254/100
5,094,435 A * 3/1992 Depperman ....... B23K 37/0536
                                                            269/43
(Continued)

FOREIGN PATENT DOCUMENTS

EP      1544376 A2   6/2005
EP      1629946 A2   3/2006
(Continued)

OTHER PUBLICATIONS

Danish Patent and Trademark Office, Search Report in PA201470230, dated Oct. 20, 2014.
(Continued)

*Primary Examiner* — Brian D Mattei
(74) *Attorney, Agent, or Firm* — Wood Herron & Evans LLP

(57) ABSTRACT

Tooling and a method of using the tooling for aligning flanges of a wind turbine tower segment of a tower section to correct deformities that might otherwise prevent fasteners from passing through apertures of adjacent flanges to gather the segments into tower sections.

11 Claims, 2 Drawing Sheets

(51) Int. Cl.
   *E04G 21/14*    (2006.01)
   *F03D 13/10*    (2016.01)
   *F03D 13/20*    (2016.01)
   *B25B 27/16*    (2006.01)
   *E04H 12/08*    (2006.01)
   *E04H 12/34*    (2006.01)

(52) U.S. Cl.
   CPC ...... *E04H 12/342* (2013.01); *F05B 2230/604* (2013.01); *F05B 2240/912* (2013.01); *Y02E 10/728* (2013.01)

(58) Field of Classification Search
   CPC ............ E04F 21/1877; F05B 2230/604; F05B 2240/912; B25B 27/16; F16L 23/003; F16L 11/09; Y10T 29/53917
   See application file for complete search history.

(56) References Cited

U.S. PATENT DOCUMENTS

| | | | |
|---|---|---|---|
| 5,228,181 A | 7/1993 | Ingle | |
| 5,560,091 A | 10/1996 | Labit, Jr. | |
| 6,983,525 B2 * | 1/2006 | Moreno | B23Q 3/186 228/49.1 |
| 9,527,173 B2 * | 12/2016 | Edwards | B23P 19/10 |
| 2010/0186342 A1 * | 7/2010 | Ollgaard | E04H 12/085 52/745.17 |
| 2014/0101906 A1 | 4/2014 | Nakamura | |

FOREIGN PATENT DOCUMENTS

| | | |
|---|---|---|
| EP | 2538000 A2 | 12/2012 |
| JP | 6178584 | 5/1984 |
| JP | 2001248760 A | 9/2001 |
| KR | 20140008933 A | 1/2014 |
| WO | 2004083633 A1 | 9/2004 |
| WO | 2006106333 A1 | 10/2006 |
| WO | 2013130544 A1 | 9/2013 |
| WO | 2013181704 A1 | 12/2013 |

OTHER PUBLICATIONS

European Patent Office, International Search Report and Written Opinion in PCT Application Serial No. PCT/DK2015/050095, Jun. 22, 2015.

* cited by examiner

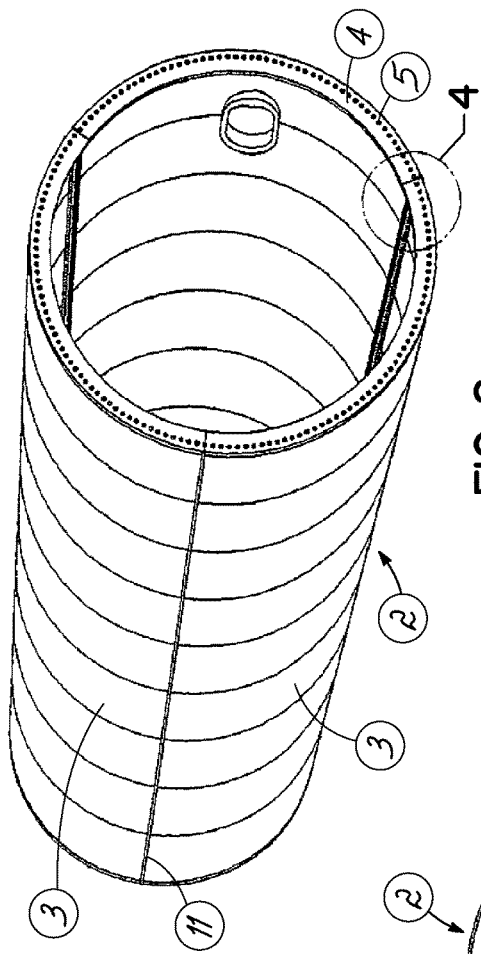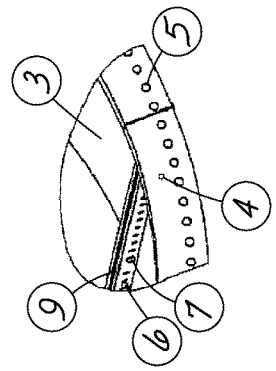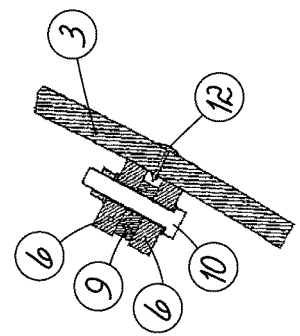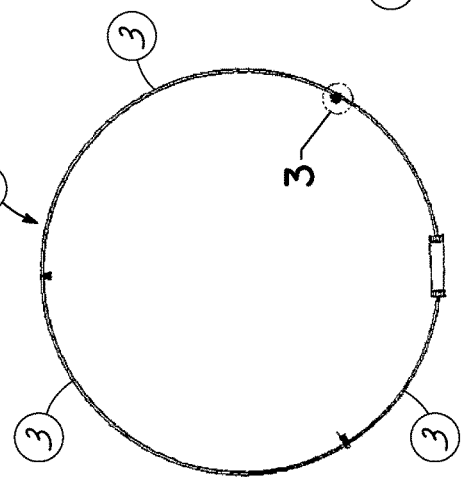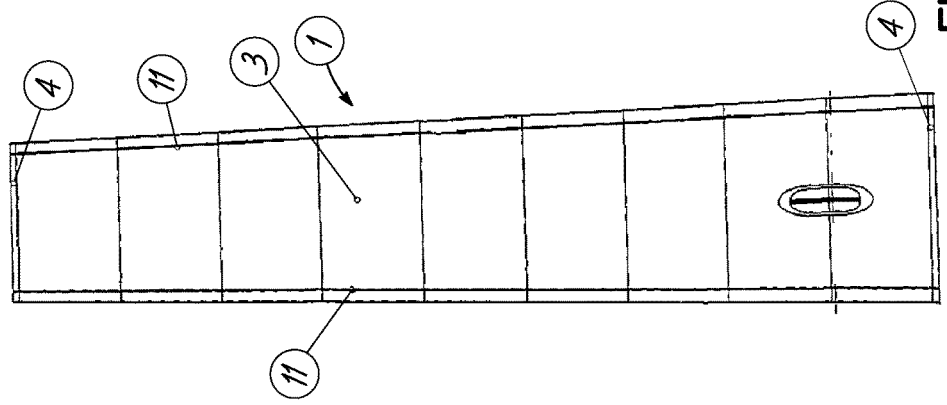

METHOD AND TOOL FOR ASSEMBLING TOWER ELEMENTS

FIELD OF THE INVENTION

The present invention relates to gathering tower elements and in particular to gathering elements in large diameter towers for wind turbines.

BACKGROUND OF THE INVENTION

A desire for an increasing power output per turbine requires wind turbines with larger generators, which in turn need larger blades to capture more energy from the incident wind. Such turbines also require wider and taller towers to support the blades, nacelle and other components. The increasing physical dimensions of modern wind turbine towers lead to difficulties in transporting the tower from the manufacturing site to the installation site where the wind turbine is to be constructed. For this reason, for some towers, each vertical section of the tower formed at the tower production site is divided into a number of longitudinal segments for easier transport to the installation site. The segments are smaller than a whole vertical section and can be transported more easily.

However, upon reaching the tower erection site, this number of segments must be gathered again to complete the tower. In one method for gathering the segments, flanges have been welded upon the segments along the division line for the segments to be gathered again by e.g. bolts. Ideally, upon arrival to the tower erection site, the segment flanges will then fit together turning the segments into a perfectly conical shaped section to facilitate mating with adjacent tower sections. However, in reality deformation of the segments may occur when these are transported to a tower erection site, for instance due to gravity influence on the segments during transport and gathering. With such misaligned segments in both horizontal and vertical directions, it may be difficult to gather the segments into sections again as such misalignments may prevent fasteners from being passed through the apertures of adjacent flanges.

Therefore a need exists for an improved method for gathering such tower elements.

SUMMARY OF THE INVENTION

The present invention relates to a method of aligning vertical flanges of two wind turbine tower segments when assembling a tubular wind turbine tower section for a wind turbine tower, the method comprising positioning a first flange of a first wind turbine tower segment and a second flange of a second wind turbine tower segment adjacent one another.

The method further comprises positioning a flange alignment tool such that a reaction pin hereof engages in a mounting aperture of said first flange. Further an extending of a first extension member of said flange alignment tool in a direction along the axis of the reaction pin towards so as to abut said second flange and an extending of a second extension member of said flange alignment tool in a direction orthogonal to the axis of the reaction pin towards so as to abut said second flange. Following this extending said first extension member further to urge said second flange towards said first flange and extending said second extension member further to urge a second aperture of said second flange towards an axis of a first aperture of said first flange.

Finally the method comprises installing and fastening at least one set of fasteners into said first and second apertures of the pair of flanges.

The present invention further relates to a flange alignment tool to be used with the above-mentioned method for aligning vertical flanges of two wind turbine tower segments when assembling a tubular wind turbine tower section for a wind turbine tower. The tool comprises a reaction pin, a first extension member, and a second extension member for the use described above.

BRIEF DESCRIPTION OF THE DRAWINGS

The invention will now be described in further detail with reference to the accompanying drawings in which FIG. 1 is an elevated side view of one out of three shell segments of a windmill tower section and consisting of several lengths of shells welded together one after the other, FIG. 2 is a perspective view of a tower section consisting of three segments bolted together in lateral direction, FIG. 3 is a detailed view of a vertical flange connection inside the tower section, extending perpendicular to the plane of the drawing, FIG. 4 is a detailed view of horizontal and vertical flanges, respectively, encircled in FIG. 2, FIG. 5 is a cross-sectional view showing a tower section comprised of three shell segments.

The accompanying drawings are not intended to be drawn to scale. In the drawings, each identical or nearly identical component that is illustrated in various figures may be represented by a like numeral. For purposes of clarity, not every component may be labelled in every drawing.

DETAILED DESCRIPTION OF THE DRAWINGS

Figure 6:
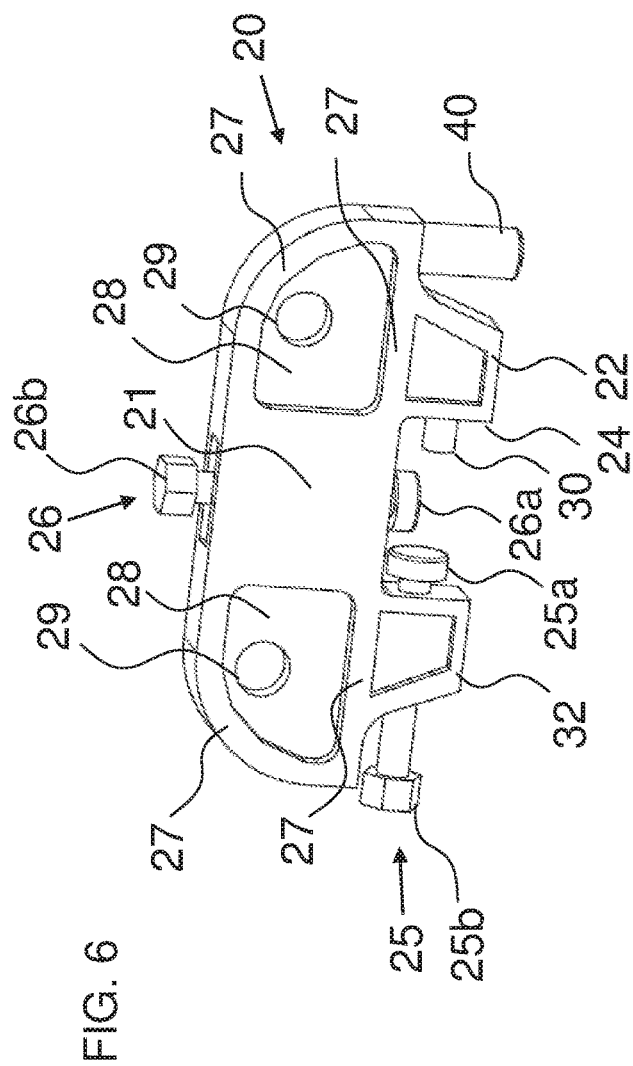
FIG. 6 is a perspective view of a flange alignment tool according to an embodiment of the invention.

A shell segment of a windmill tower built according to the invention is shown in FIG. 1 and further details are shown in FIGS. 2-5. The tower 1 comprises a number of shell segments of rolled steel plates, which are bolted together side-by-side to make up complete circumferential tower sections 2 (see FIGS. 2 and 5), said sections being secured one on top of another by bolts (see FIGS. 3 and 4). In FIG. 2, a segment 3 shows several lengths 3 of shell welded together along abutting upper and lower edges. Each top and bottom edge of a combined length of shell segments 3 are provided with a plane horizontal flange 4 extending inwardly and carrying a large number of throughholes 5 to receive corresponding bolts for tightening sections securely together.

Plane vertical flanges 6 provided with a large number of throughholes 7 may be welded in such distance from the edge of the respective shell that an elongated spacer bar 9 may be sandwiched between the vertical flanges 6, as they are tightened together by means of bolts 10. In other embodiments the vertical flanges are abutting each other directly. Both the horizontal flanges 4 and the vertical flanges 6 may help provide rigidity to the conically shaped walls.

On the outside of the tower, vertical joints 11 are visible until the joint is filled with a filler material and/or a filler element 12. In a similar manner, the horizontal joints between sections could be made invisible.

It is obvious that the number of shell segments, into which a section is divided, can be determined considering the limitations imposed by the infrastructure; meaning low bridges, narrow tunnels, etc.

Further, the choice of connection means is in no way restricted to being bolts and nuts, but they are common and suitable means, especially also in order to take advantage of the prefabricated surface treatment, which should be kept intact.

As mentioned earlier, ideally, upon arrival to the tower erection site, the segment flanges will fit perfectly together turning the segments into a perfectly conical shaped section to facilitate mating with adjacent tower sections. However, in reality deformation of the segments may occur when these are transported to a tower erection, for instance due to gravity influence on the segments during transport and gathering. Hereby it may be easy with known methods to gather the segments until the final gathering. For instance with three segments, segment A and B can be gathered and segment B and C can be gathered without big issues. However, the un-gathered flanges of segment A and C to be gathered may due to deformation be resting with some length between these. With such slightly misaligned segments in both horizontal and vertical direction, it may be difficult to gather the segments into sections again as such misalignments may prevent fasteners from being passed through the apertures of adjacent flanges. These problems are solved according to embodiments of the present invention.

Figure 7:
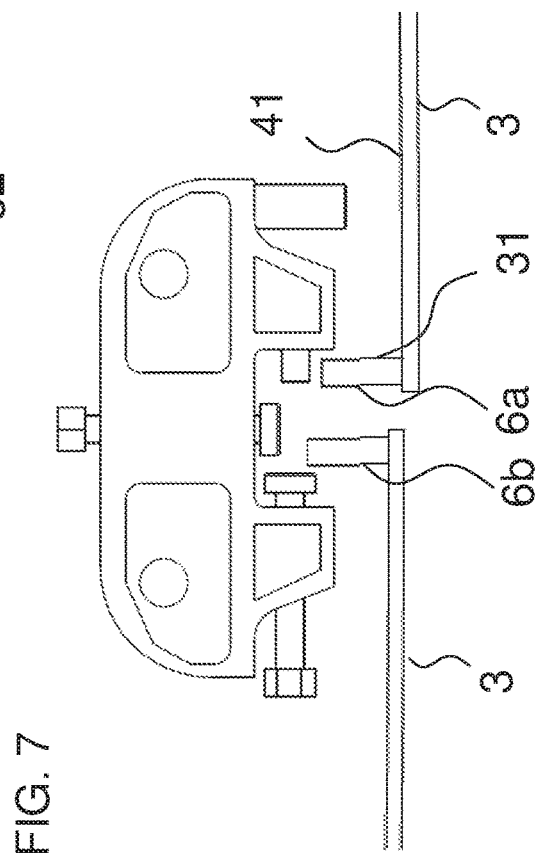
FIG. 7 is a detailed cross-sectional view of tower segments and vertical flanges, also showing the use of a flange alignment tool according to an embodiment of the invention.

FIGS. 6 and 7 shows one embodiment of a flange alignment tool 20 that may be used to align the flanges 6a and 6b of two shell segments 3. The tool includes a body 21 that provides structural support to a first portion 22 of the tool that mounts to a first flange 6a that will for the remaining steps be more or less rigidly connected to the tool via a reaction pin 30 extending from the flange seating surface 24 and sized to fit within an aperture of the first flange 6a.

The body 21 further provides structural support to a second portion 32 of the tool that supports first extension member 25 capable of pushing against the second flange 6b to urge the two flanges towards each other in the horizontal direction.

Further the body 21 supports second extension member 26 capable of pushing against the second flange 6b to urge the two flanges towards each other in the vertical direction.

As may be appreciated, at least portions of the body may be placed in bending during use. To provide for strength in bending, the body includes beam-like structures 27 at outer and inner portions of the tool and that may be connected by one or more gussets (not shown). In the disclosed tool, the beam like structures 27 in both ends of the tool surrounds thin sheet areas 28 of less strength, with respective throughholes 29 for easy handling. It is to be appreciated, however, that other body constructions are also possible.

The tool may include various features that contact and stabilize the tool with respect to the first flange 6a. A flange seating surface 24 is configured to rest directly on horizontal surface 31 of the first. The flange seating surface 24 may include a permanent magnet (not shown) to help hold the tool in position on the first flange.

Additionally, a reaction member 40 extends from the body of the tool to contact the inner surface 41 of the wall of the tower segment. An adjustable mounting, such as a threaded engagement, may allow the reaction member to be moved to contact the wall of the tower section, which may be positioned different distances from the apertures on different towers or even on different sections of a common tower. It is noted that the reaction member 40 in the figs. is shown in a simplified version, where the adjustable mounting is not visible.

As mentioned, the tool includes first extension member 25 to contact the second flange 6b. As illustrated, the extension member 25 includes a first end 25a for contacting the second flange from directly along the longitudinal axis of the reaction pin 30 to push the flanges together, a second end 25b that receives a tool to move the threaded bolt-like structure, and a shank that includes threads that mate with the tool and that allow the extension member 25 to be moved with respect to the body 21 of the tool.

Further as mentioned, the tool includes second extension member 26 to contact the second flange 6b. As illustrated, the extension member 26 includes a first end 26a for contacting the second flange from above orthogonal to the longitudinal axis of the reaction pin 30, a second end 26b that receives a tool to move the threaded bolt-like structure, and a shank that includes threads that mate with the tool and that allow the extension member 26 to be moved with respect to the body 21 of the tool.

According to some embodiments, the body of the tool itself may be threaded to receive the first and/or second extension member. Alternatively, inside the tool a threaded nut may be placed, that, in turn, receives the extension member. The nut may be held within a slot in the body of the tool to allow the nut to move upward and downward as may be desired to position the extension member in an optimal spot on the flange to be urged outwardly. Additionally or alternatively, the nut may be removed from the tool in case of wear/damage, or if a different size extension member is desired for use.

FIG. 7 illustrates a pair of mating flanges 6a and 6b that are misaligned for instance due to deformation of the individual segments of the tower section. Hereby the resting position of the segments creates a misalignment in both a horizontal and vertical direction. The terms "horizontal" and "vertical" are used herein for explanatory reasons and should in this context only be interpreted as directions in relation to the mounted tool, in which, with reference to FIG. 7, "horizontally" means the left-right direction along the shell segments 3, whereas "vertically" means the up-down direction along the flanges 6a and 6b. Most often the mounted tool will be used where horizontally means substantially aligned with the ground level, but this is not essential for the use of the tool.

This misalignment in both directions creates problems in that at least some of the apertures in the flanges are not aligned with one another and it is not directly possible to get fasteners through the apertures. In this scenario, the reaction pin 30 may be inserted into an aperture on a first flange 6a.

With the reaction pin 30 positioned within an aperture, the reaction member 40 may be adjusted to make contact with the inner wall of the tower section 3 to thereby support the tool further before starting to force the movement of flanges.

The first extension member 25 may be moved inward or outward, as desired, to place the first end 25a of the first extension member 25 into contact at a vertical surface of the second flange 6b. The second end 25b of the first extension member 25 may be rotated with a wrench or power tool to push the first flange 6a and the second flange 6b towards each other. The second extension member 26 may be moved upward or downward, as desired, to place the first end 26a of the second extension member 26 into contact at a horizontal surface of the second flange 6b. The second end 26b of the second extension member 26 may be rotated with a wrench or power tool to push the second flange 6b vertically downwards to the extent that fasteners are allowed to pass through the apertures of both flanges. Once the apertures are aligned and enough fasteners have been secured to hold the flanges in position, the extension members of the tool may be released and the tool may be removed from the flange to allow a fastener to be installed in the aperture previously occupied by the reaction member.

According to some embodiments, the second ends 26a and 26b of the extension members are constructed to be actuated with the same driver used to secure fasteners that hold the flanges to one another. In this respect, assemblers may use a minimum number of tools when mating tower sections to one another, thus minimizing valuable time during which a crane is used to support the section. According to some embodiments, the second end of the extension member and the fasteners include a hex head of a bolt that may be rotated with a wrench, either manually or with power tools.

It should be noted that obviously the extending of the first and second extension members may be carried out in any desired sequence; however in a preferred embodiment the two extension members are made to abut the flange followed by tightening the second extension member before tightening the first extension member.

It should be understood that aspects of the invention are described herein with reference to the figures, which show illustrative embodiments in accordance with aspects of the invention. The illustrative embodiments described herein are not necessarily intended to show all aspects of the invention, but rather are used to describe a few illustrative embodiments. Thus, aspects of the invention are not intended to be construed narrowly in view of the illustrative embodiments. In addition, it should be understood that aspects of the invention may be used alone or in any suitable combination with other aspects of the invention.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

The invention claimed is:

1. A method of aligning vertical flanges of two wind turbine tower segments when assembling a tubular wind turbine tower section for a wind turbine tower, the method comprising:
    positioning a first flange of a first wind turbine tower segment and a second flange of a second wind turbine tower segment adjacent one another;
    positioning a reaction pin of a flange alignment tool in a mounting aperture of said first flange, wherein the reaction pin defines an axis;
    extending a first extension member of said flange alignment tool in a direction coaxial to the axis of the reaction pin so as to abut said second flange;
    extending a second extension member of said flange alignment tool in a direction orthogonal to the axis of the reaction pin so as to abut said second flange;
    extending said first extension member further to urge said second flange towards said first flange;
    extending said second extension member further to urge a second aperture of said second flange towards an axis of a first aperture of said first flange; and
    installing and fastening at least one set of fasteners into said first and second apertures of the pair of flanges.

2. The method of claim 1 further comprising:
    removing the flange alignment tool and installing and fastening a fastener in the aperture previously occupied by the flange alignment tool.

3. The method of claim 1, further comprising:
    extending said first extension member further to urge said second flange towards said first flange until the clearance between the flanges are within 20 mm.

4. The method of claim 1, further comprising:
    extending said second extension member further to urge a second aperture of said second flange towards an axis of a first aperture of said first flange until both flanges are leveled.

5. The method of claim 1, further comprising:
    extending a reaction member from the flange alignment tool to contact an inner surface of the wall of the tower segment, said extending being carried out via an adjustable mounting.

6. The method of claim 1, wherein said fasteners comprise bolt, washer and nut.

7. The method of claim 1, wherein extending the first and/or second extension member includes, through the use of a hydraulic actuator or a fastening tool, rotating threaded extensions of the flange alignment tool to cause the extension member of the tool to move toward the second flange.

8. The method of claim 7, wherein said fastening tool is sized to mate with and to tighten said fasteners.

9. The method of claim 1, further comprising:
    extending said first extension member further to urge said second flange towards said first flange until the clearance between the flanges are within 10 mm.

10. The method of claim 1, further comprising:
    extending said first extension member further to urge said second flange towards said first flange until the flanges abut each other.

11. The method of claim 5, wherein the adjustable mounting includes a threaded engagement or a hydraulic actuator.

* * * * *